(12) United States Patent
Andersen et al.

(10) Patent No.: US 7,168,207 B2
(45) Date of Patent: Jan. 30, 2007

(54) POTATO DRIP IRRIGATION SYSTEM AND METHOD

(75) Inventors: Brian L. Andersen, 12078 Division St., Royal City, WA (US) 99357; Robert Mittelstadt, Moses Lake, WA (US); Michael Andersen, Othello, WA (US); Gary Christensen, Royal City, WA (US)

(73) Assignee: Brian L. Andersen, Royal City, WA (US)

( * ) Notice: Subject to any disclaimer, the term of this patent is extended or adjusted under 35 U.S.C. 154(b) by 534 days.

(21) Appl. No.: 10/409,981

(22) Filed: Apr. 8, 2003

(65) Prior Publication Data

US 2004/0200363 A1 Oct. 14, 2004

(51) Int. Cl.
A01G 1/00 (2006.01)
(52) U.S. Cl. .......................................................... 47/89
(58) Field of Classification Search ..................... None
See application file for complete search history.

(56) References Cited

OTHER PUBLICATIONS

C.C. Shock et. al.; ☐☐Planting Configuration and Plant Population Effects on Drip-Irrigated Umatilla Russet Potato Yield and Grade;☐☐2004;☐☐Oregon State University;☐☐http://www.cropinfo.net/AnnualReports/2004/plant%20config%20 &%20population%20ef . . . .*
C.C. Shock et. al.;☐☐Irrigation System Comparison for the Production of Ranger Russet and Umatilla Russet Potato;☐☐2004;☐☐Oregon State University;☐☐http://www.cropinfo.net/AnnualReports/2004/ranger%20umatilla%20compare04.htm.*
C.C. Shock et. al.;☐☐Report for 2003WA41B;☐☐Water USe of Potato Under Sprinkler and Subsurface Drip Irrigation☐☐Oregon State University.*
"Effect of Tape Positioning on Shepody Crop Response to Drip Irrigation"; 1998 Grand Falls Research and Extension Report; 7 pages.
"Early and Late Harvest Potato Variety Response to Drip Irrigation", by Clinton C. Shock, Eric P. Eldredge, and Lamont D. Saunders; Malheur Experiment Station, Oregon State University, Ontario, OR: 1995: 5 pages.

(Continued)

*Primary Examiner*—Francis T. Palo
(74) *Attorney, Agent, or Firm*—Wells St. John P.S.

(57) ABSTRACT

An arrangement is provided for improving the yield of potato crops. The arrangement includes a bed, a plurality of pairs of parallel rows of potato plants, and a drip irrigation tape. The bed is provided for multiple rows of potato plants. The plurality of pairs of parallel rows of potato plants in the bed have an inter-row gap between the rows in each pair of rows spaced from one another sufficiently to provide a moisture permeable agronomic soil corridor between the rows in each pair of rows to provide a supply of water to a root zone of each row within each pair of rows of potato plants while maintaining aerated soil within and above the agronomic soil corridor to reduce excessively wet conditions adjacent the crop canopy and a solar light corridor provided between adjacent pairs of rows to provide increased solar energy to the potato plants. The drip irrigation tape has emitters provided intermediate rows within each pair of parallel rows of potato plants below a soil surface of the bed in the agronomic soil corridor. A method is also provided.

27 Claims, 8 Drawing Sheets

OTHER PUBLICATIONS

"Drip-Irrigation Management Factors for Umatilla Russet Production", by Clinton C. Shock, Eric P. Eldredge, and Lamont D. Saunders; Malheur Experiment Station, Oregon State University, Ontario, OR; 2000; 6 pages.

"Drip-Irrigation Management Factors for 'Umatilla Russet' Production", by Clinton C. Shock, Eric P. Eldredge, and Lamont D. Saunders; Malheur Experiment Station, Oregon State University, Ontario, OR; 2001; 13 pages.

"Early and Late Harvest Drip-Irrigated Red and Russet Varieties", by Clinton C. Shock, Eric P. Eldredge, and Lamont D. Saunders; Malheur Experiment Station, Oregon State University, Ontario, OR; 2000; 7 pages.

"Drip-Irrigated Red and Russet Potato Varieties Harvested Early or Late", by Clinton C. Shock, Eric P. Eldredge, and Lamont D. Saunders; Malheur Experiment Station, Oregon State University, Ontario, OR; 2001; 8 pages.

"Management Factors Enhancing the Feasibility of Subsurface Drip Irrigation for Potato", by Clinton C. Shock, Eric P. Eldredge, Erik B.G. Feibert, and Lamont D. Saunders; Malheur Experiment Station, Oregon State Univ., Ontario, OR; 1997; 7 pages.

"Early and Late Harvest Potato Variety Response to Drip Irrigation", by Clinton C. Shock, Eric P. Eldredge, and Lamont D. Saunders; Malheur Experiment Station, Oregon State University, Ontario, OR; 1999; 5 pages.

William R. DeTar, Greg T. Browne, Claude J. Phene. Blake L. Sanden; "Real-time irrigation scheduling of potatoes with sprinkler and subsurface drip systems"; Jul. 20, 2001; http://www.netafirm.com/netafirm/doa_iis.dll/Serve/Item/English/1441 10 html; 1 page.

"Seed Piece Spacing Influences Yield Tuber Size Distribution, Stem and Tuber Density, and Net Returns of Three Processing Potato Cultivars", by Stephen L. Love and Asunta Thompson-Johns; HortScience, vol. 34(4); Jul. 1999; pp. 629-633.

"Effect of Population and Seed Size on the Yield of Two MainCrop Potato Cultivars"; by P. Barry, T.S. Storey, and T. Quinlivan; Irish Journal of Agricultural Research, vol. 20, No. 1; 1981; pp. 71-79.

* cited by examiner

FIG. 2
PRIOR ART

POTATO DRIP IRRIGATION SYSTEM AND METHOD

TECHNICAL FIELD

This invention pertains to plant husbandry. More particularly, the present invention relates to potato plant arrangements and methods of planting potatoes which improves crop yield and quality.

BACKGROUND OF THE INVENTION

The production of potatoes forms an important portion of the agriculture economy of the United States. Potatoes are used for both fresh vegetable markets, as well as value-added processed foods. For example, in the United States approximately 1.25 million acres of potatoes are planted each year. This acreage results in a farm-gate value of 3.06 billion dollars, according to the National Agricultural Statistician Service (NASS) of the U.S. Department of Agriculture (USDA), for year 2001. Within Washington State alone, approximately 160,000 acres of potatoes are grown annually for both domestic and international consumption. As in any industry, there exists a desire to increase productivity and efficiency in the process of taking a potato crop from a planting stage to a point-of-sale stage.

From the perspective of a grower or farmer, profitability is partly a function of crop yield, where crop output is maximized relative to input costs. Incentives are also an important part of profitability, where a grower is able to produce a crop meeting preset quality criteria. From a processing and packing perspective, final end product often defines the desired size and shape of raw product. For example, a french fry processor specializing in long, "steak"-cut style fries will want a uniform supply of 10 to 14 ounce potatoes. Likewise, a packer supplying fresh potatoes to restaurants for baking will want a uniform supply of 10 to 12 ounce potatoes with good skin quality. Extra costs are incurred when additional sorting, grading and transportation steps are required in order to meet the specific needs of particular processors and packers. Moreover, the additional handling of potatoes can decrease their quality due to bruising and other factors. Therefore, for the packer and processor, there are efficiencies to be gained by providing a potato production system that is specifically designed to deliver a specific end product. Furthermore, the commercial grower is also in a position to benefit financially by providing a raw product with higher market value. The same principles apply in the seed potato industry, where commercial growers desire receiving seed of uniform size and vigor from the seed grower. For example, the quality of seed has a great bearing on the performance and ultimate success of a potato crop.

A vast majority of acreage that is put into potato production each year in the U.S. is in geographic areas that require full or supplemental irrigation in order to meet crop water requirements. Current state-of-the-art in U.S. potato production uses center-pivot irrigation machines on large fields (typically over 60 acres), in order to make efficient use of farm equipment. Typically, potatoes are planted in a "hill" system where potato rows are separated by relatively deep furrows. These hills are typically spaced 34 or 36 inches apart depending on equipment conventions in the growing region.

Center-pivot irrigation is popular for several reasons. Much of the labor cost associated with irrigation is eliminated, center-pivot machines can be adapted to rolling and hilly ground and fertilizer and other products can be delivered in a metered manner through the irrigation water. However, there are disadvantages to center-pivot irrigation systems. One problem is that water is applied from overhead, potentially leading to excessively wet conditions within the crop canopy that tends to increase the potential for disease. Due to the intensity of the irrigation under a center-pivot irrigation device, there is also a tendency for the impact of water droplets to "beat down" the soil and canopy, which has a negative effect on plant health as well. Furthermore, there are limits as to how frequent an area within the irrigated field can receive needed moisture as it depends upon the traveling speed of the system. These factors do provide some challenges to growing an "above average" crop that suits many target markets.

In order to produce a high yielding crop that is uniform in size, shape and quality, there exist three primary requirements. First, there exists a need to provide for optimal plant spacing to take advantage of available field area and sunlight. Secondly, there exists a need to provide a uniform and favorable growing environment, such as a suitable amount of available soil moisture and nutrients. Finally, there exists a need to keep the plants healthy through maturity.

With a conventional hill planting system, there are severe limitations to providing optimal plant spacing. This is because the only variable that can be manipulated is the spacing of potato plants within a row. The spacing between rows is fixed due to the noted conventions in planting and harvest equipment. It follows that the grower is therefore unable to specifically and uniformly define the field area occupied by each plant. Research studies have shown that yield is directly related to cumulative intercepted sunlight energy by the plants. Therefore, it is important for the plant canopy (leaf area) to quickly and efficiently cover the field at an early stage in the season and, in doing so, it is also important that each potato plant "sees" the same amount of sunlight. A side-benefit of having early ground cover is the moderating effect the plant canopy has on temperatures within the canopy and in the soil, which is conducive to favorable and uniform growing conditions.

In consideration of the second requirement, the ability to "feed" or supply water and nutrients at the appropriate time and rate is fundamental to supporting steady plant growth and thereby producing a healthy, uniform crop. In achieving this end, there exists a need for a new, improved technique of drip irrigation that will provide a means by which water and nutrients can be delivered directly to the plant root zone according to the plant's needs. There is an additional need to provide for the delivery of moisture requirements below the soil surface, so that excessively wet conditions in the plant canopy can be avoided, thereby mitigating certain disease potential. Lastly, a system is needed that is capable of producing a high degree of uniformity of potato crop field-wide so that each plant is supplied equally with water and nutrients, including optional fertilizer.

Figure 1:
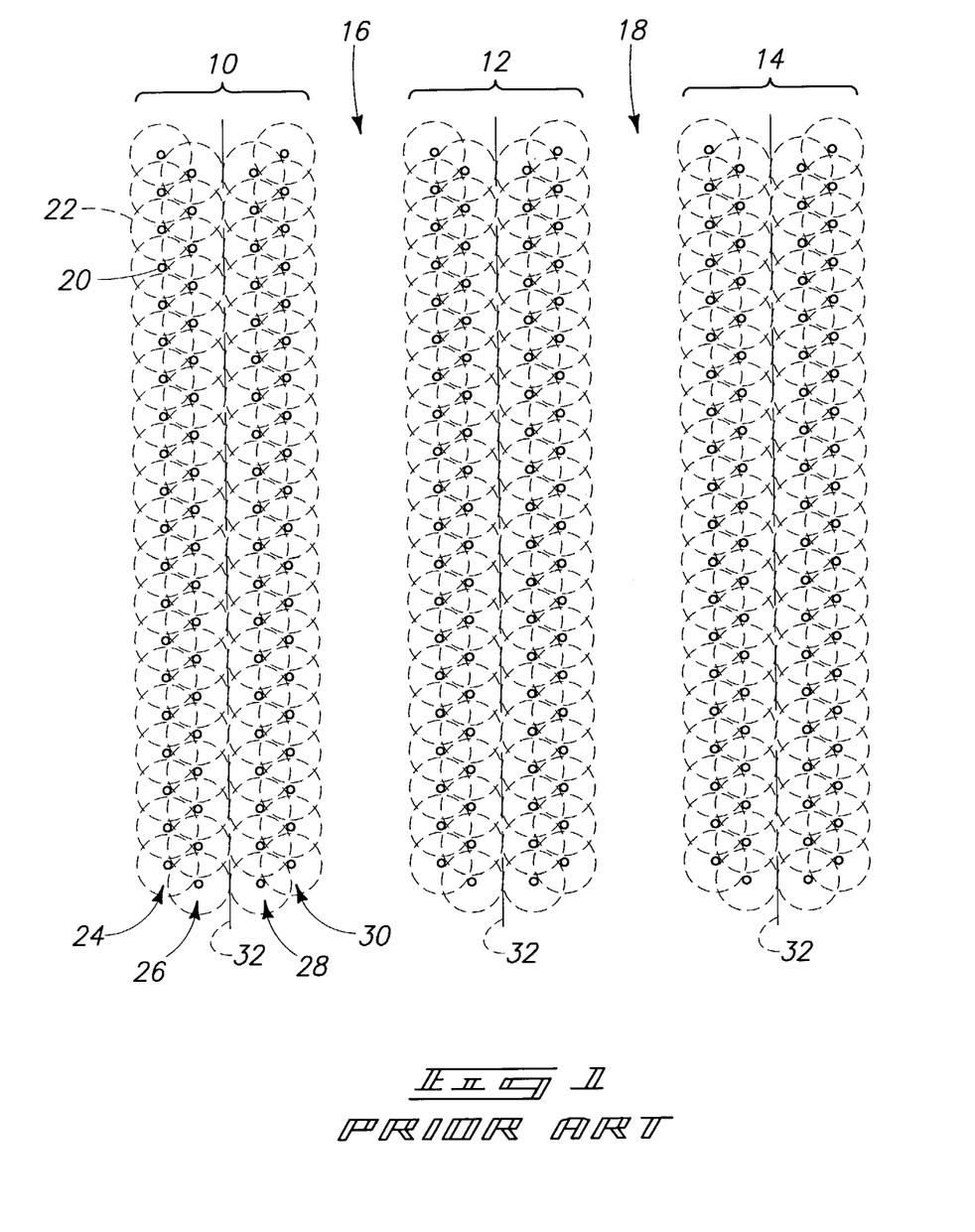
FIG. 1 is simplified plan view layout of a segment of potato crop according to one prior art planting system and method depicting the crop and system adjacent a bed surface.

FIG. 1 illustrates a prior art potato irrigation system that uses irrigation drip tape for irrigating beds 10, 12, and 14 of potatoes represented by seeds 20 having a maturing canopy 22. Seeds 20 are configured in rows 24, 26, 28, and 30. An irrigation drip tape 32 is provided between the two center rows 26 and 28 of each bed 10, 12, and 14. The outer rows 24 and 30 are not optimally irrigated by tape 32 because they are spaced apart from tape 32 an unacceptable distance which means that outer rows are under-watered (or inner rows are over-watered).

The system of FIG. 1 represents seed potato production at a known location in France using drip irrigation. A soil surface view of the beds is shown. Seed spacing was 9.7 inches along each row, with four lines on a 71-inch bed. Plant population was 36,437 plants/acre.

Figure 2:
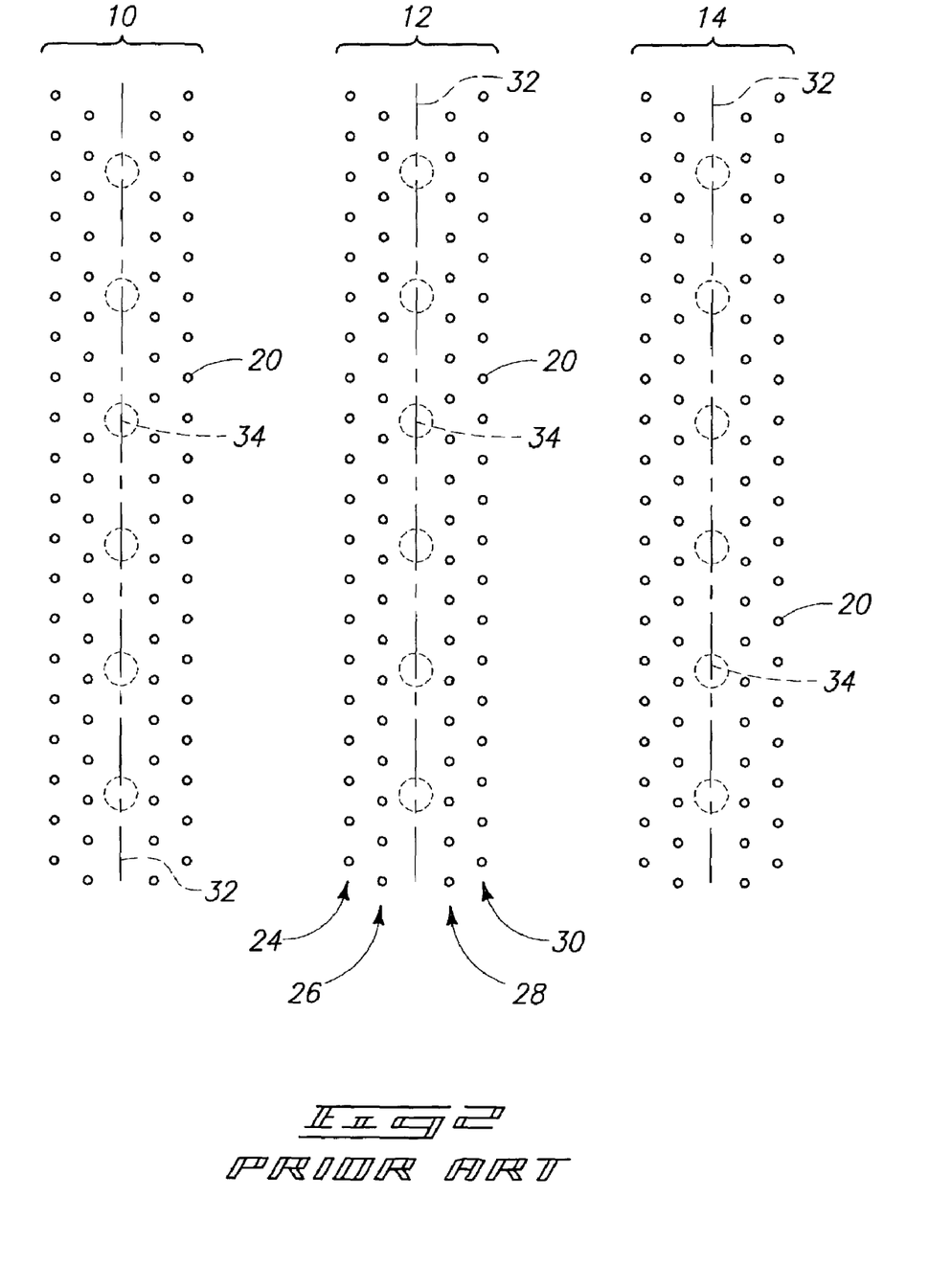
FIG. 2 is a simplified plan view layout of the prior art system and method of FIG. 1 depicting the crop and system beneath the bed surface and just above the drip system emitters.

FIG. 2 illustrates a sub-surface view taken just above the irrigation drip tape within beds 10, 12, and 14. Emitters 34 are shown spaced along each tape 32. The inefficient placement of emitters 34 places many seeds (and plant root systems) too far from emitters 34 to optimize plant production and effectively reduce disease.

The system and method of potato production presented herein gives a grower an advantage in meeting the above-identified deficiencies.

SUMMARY OF THE INVENTION

An arrangement is provided for improving the growing and the yield of potatoes from potato plants.

According to one aspect, an arrangement is provided for improving the yield of potato crops. The arrangement includes a bed, a plurality of pairs of parallel rows of potato plants, and a drip irrigation tape. The bed is provided for multiple rows of potato plants. The plurality of pairs of parallel rows of potato plants in the bed have an inter-row gap between the rows in each pair of rows spaced from one another sufficiently to provide a moisture permeable agronomic soil corridor between the rows in each pair of rows to provide a supply of water to a root zone of each row within each pair of rows of potato plants while maintaining aerated soil within and above the agronomic soil corridor to reduce excessively wet conditions adjacent the crop canopy and a solar light corridor provided between adjacent pairs of rows to provide increased solar energy to the potato plants. The drip irrigation tape has emitters provided intermediate rows within each pair of parallel rows of potato plants below a soil surface of the bed in the agronomic soil corridor.

According to another aspect, an arrangement is provided for improving the growing of potato crops. The arrangement includes a bed for multiple rows of potato plants, a plurality of pairs of parallel rows of potato plants, and a line-source irrigation system comprising a drip irrigation tape. Each of the rows of potato plants has a root zone. The plurality of pairs of parallel rows of potato plants in the beds have a gap between adjacent pairs of rows. Placement of the gap, in combination with in-row potato plant spacings, provides for a substantially equidistant, equal-area arrangement of light area for a potato plant. The line-source irrigation system includes a drip irrigation tape, with emitters, provided intermediate to each row with each pair of parallel rows of potato plants. The proximity of the emitters and tape is configured to provide a substantially equal, uniform and optimal supply of water to the root zone of each plant within each row while maintaining aerated soil conditions about the root zone of each plant and mitigating excessively wet conditions within a canopy of the potato plants.

BRIEF DESCRIPTION OF THE DRAWINGS

Preferred embodiments of the invention are described below with reference to the following accompanying drawings.

FIG. 9 is a simplified isometric view illustrating potato plants growing in the bed of FIGS. 3–5.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicants' invention. An exemplary implementation is described below and depicted with reference to the drawings comprising a system and method (or arrangement) for growing potato crops, as well as improving yield and quality, identified by reference numeral 100. While the invention is described by way of a preferred embodiment, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 3:
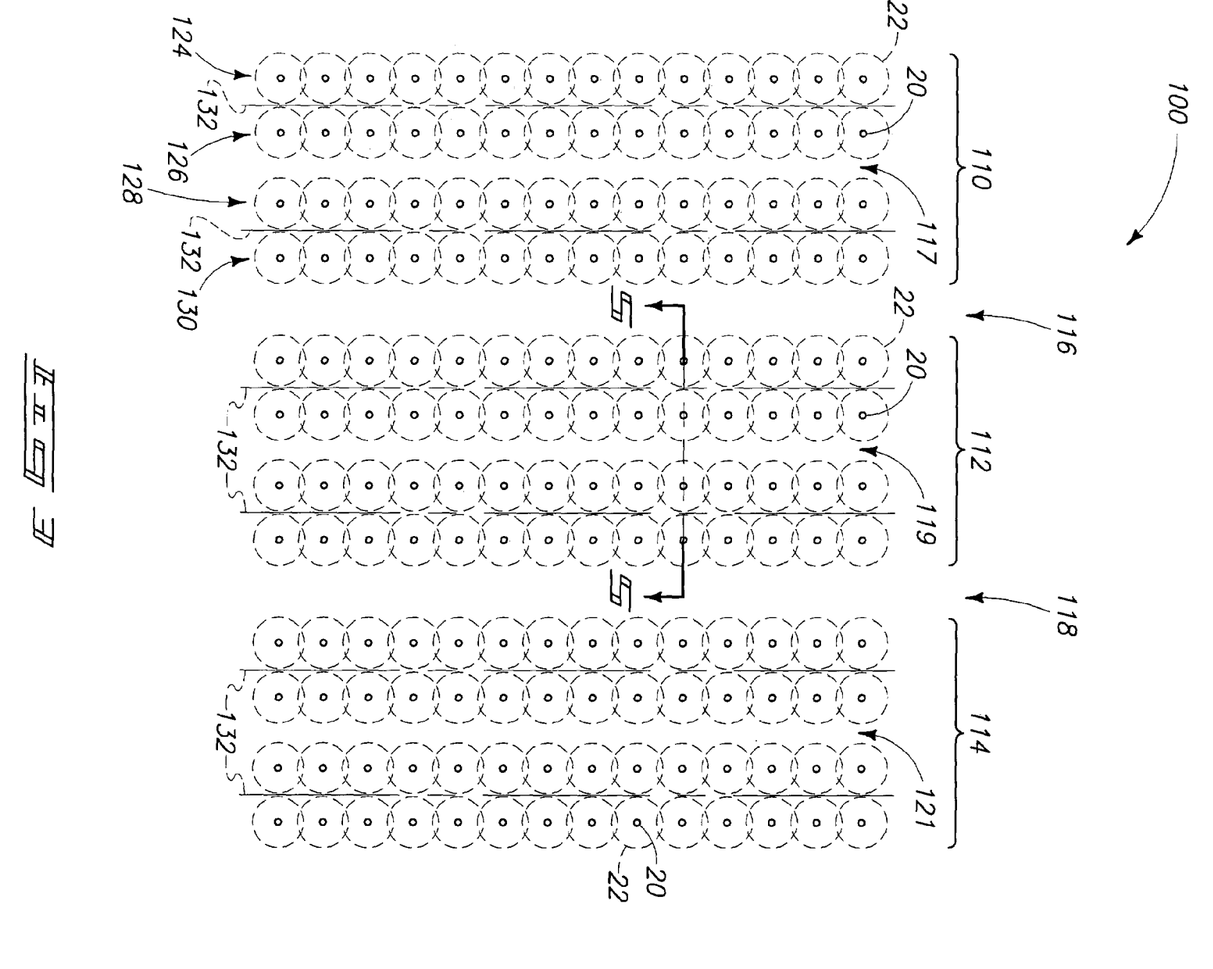
FIG. 3 is a simplified plan view layout of the present system and method of planting and producing potatoes depicting the crop and system adjacent a bed surface.

FIG. 3 depicts potato growing system 10 in simplified, schematic plan view showing a portion of three beds 110, 112, and 114 from a field with a soil surface 36 on top of each bed 110, 112, and 114. Within each bed 110, 112, and 114, individual potato seeds 20 are planted in rows 124, 126, 128, and 130. According to one embodiment, a pair of drip irrigation tapes 132 is provided in each bed 110, 112, and 114. Tapes 132 are each provided between a pair of adjacent rows 124, 126 and 128, 130 such that maximum realized growth plant canopies 22 in adjacent rows about each tape 132 are more efficiently realized. Accordingly, during earlier growth phases prior to maximum maturity, there exists a solar light corridor 40, 42 as shown in FIG. 9, prior to final maturity and maximum canopy growth.

Figure 4:
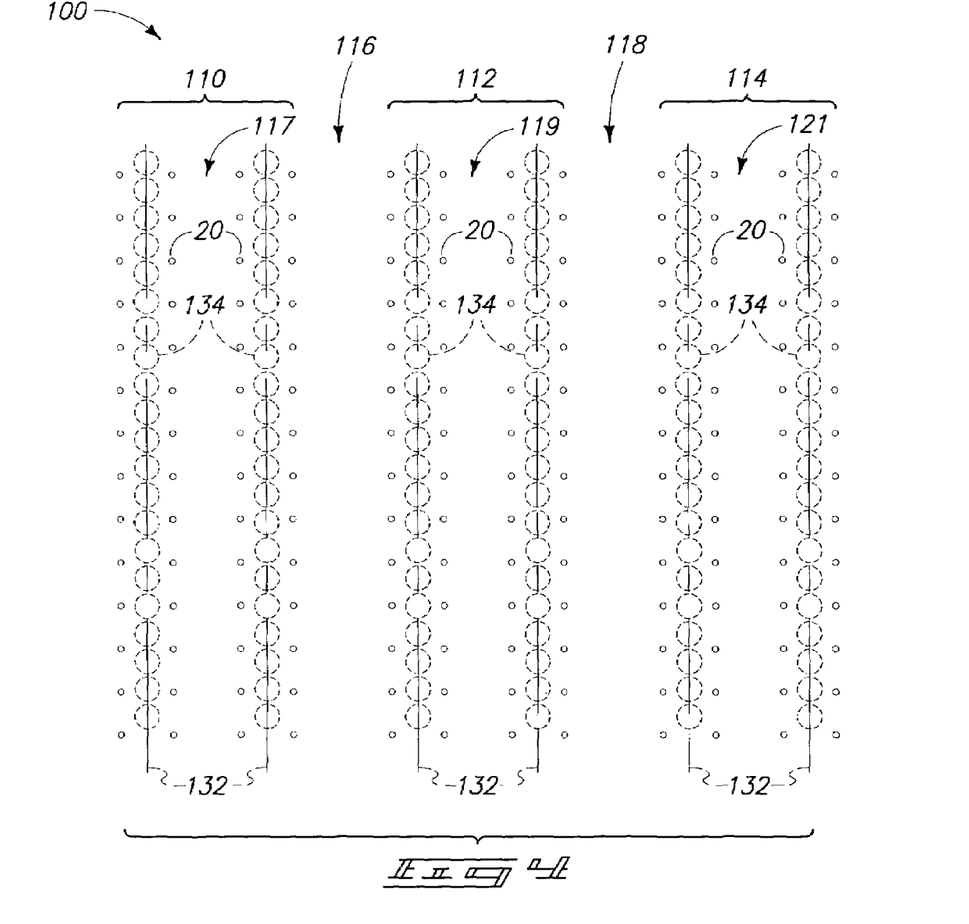
FIG. 4 is a simplified plan view layout of the present system and method of FIG. 3 depicting the crop and system beneath the bed surface and just above the drip system emitters.
Figure 5:
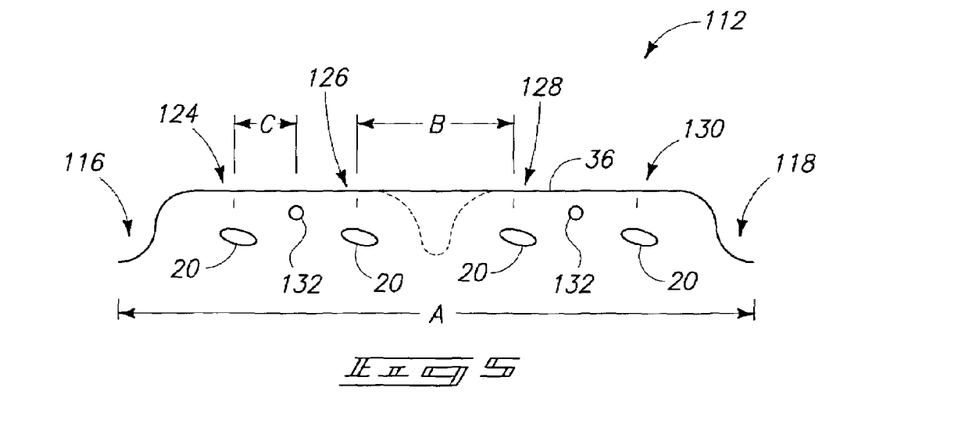
FIG. 5 is a soil sectional view taken along line 5—5 of FIG. 3 depicting the layout of seed rows and drip irrigation tape within a potato bed.
Figure 6:
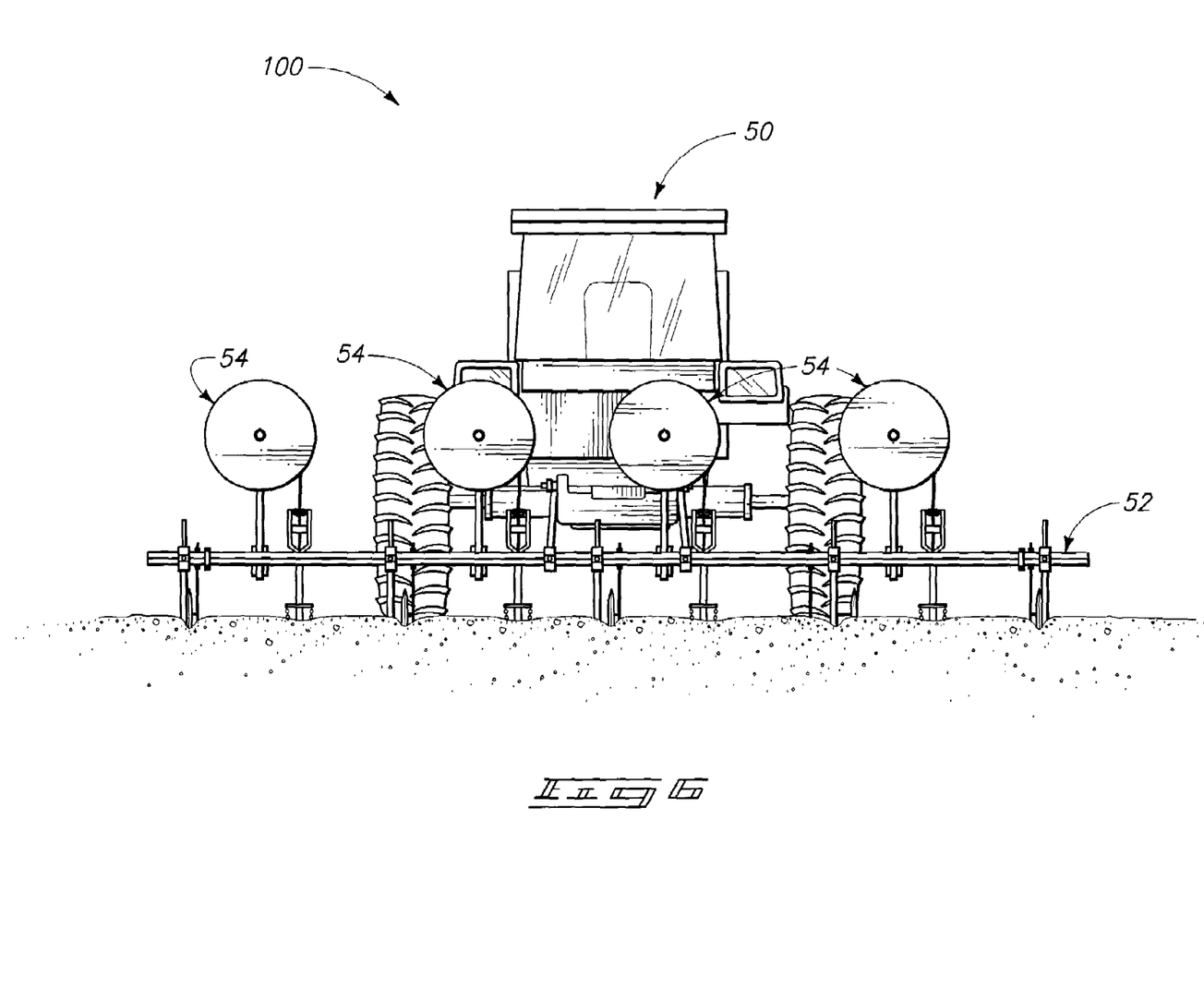
FIG. 6 is a rear view illustrating a tractor configured to lay drip irrigation tape within the potato beds of FIGS. 3–5.

Also, relatively wide inter-row gaps 116 and 118 are provided between adjacent beds 110, 112 and 112, 114, respectively, as shown in FIGS. 3–5 and 9. Gaps 116 and 118 provide for passage of wheels on a tractor 50 during seeding of potato plants and also during placement of irrigation tape using a tractor 50, as shown in FIG. 6. Furthermore, relatively narrow inter-row gaps 117, 119, and 121 are provided between neighboring pairs of rows 124, 126 and 128, 130 in each bed 110, 112, and 114. Gaps 117, 119, and 121 are provided in beds 110, 112, and 114 between adjacent rows 126 and 128 where an irrigation tape 132 is not provided.

Gaps 116 and 118 typically comprise furrows that are formed by tractor wheels, which means that gaps 116 and 118 can (in some cases) be wider than gaps 117, 119, and 121. Gaps 117, 119, and 121 are provided within beds 110, 112, and 114, respectively, in order to even out light distribution amongst individual rows so that all rows will receive a similar amount of light. If gaps 117, 119, and 121 were not provided, then potato plant rows 124 and 130 would receive a significantly greater amount of sunlight than would rows 126 and 128 which would generate a greater variation in plant growth and potato production, and would lead to non-uniformity that reduces optimal quality and production of potatoes.

Additionally, FIG. 9 illustrates immature growth of plants such that solar light corridors are provided by gaps 117, 119, and 121 (also see FIG. 3), in addition to the solar light corridors provided by wheel furrow gaps 116 and 118. As shown in FIG. 9, moisture permeable agronomic soil corridors are also provided between the rows in each pair of rows, such as between rows 124 and 126, as well as rows 128 and 130, as provided by gaps 40 and 42. Moisture is depicted in such gaps, or corridors in FIG. 9.

The invention comprises a "bed" system whereby multiple potato rows can be planted in an arrangement that is optimal for the potato variety and desired end-product. The arrangement consists of pairs of potato rows placed symmetrically within the bed and each pair irrigated by a single line of drip irrigation tape (or hose), located intermediate to the two adjacent potato rows. In the preferred embodiment, the bed system is comprised of four potato rows (two adjacent pairs) but may also be designed to accommodate a common multiple of two. This bed system gives the grower great flexibility in arranging the plant spacing, both laterally within the bed and longitudinally down the row. This flexibility is important as it allows the grower to plant precisely in terms of light area per plant (sunlight energy) and radial distance, for sufficient room within the soil for tubers to develop without interference. In addition, the drip irrigation component provides the means by which a uniform supply of water and nutrients can be provided within the root zone as required by the plant. Furthermore, by limiting the majority of irrigation to a region below the soil surface, conditions within the crop canopy that are favorable to disease can be mitigated.

FIG. 4 illustrates a simplified plan view layout of the system 100 of FIG. 3. More particularly, a potato crop and system 100 are illustrated beneath a soil surface of each bed 110, 112, and 114, just above the drip irrigation tape 132, and illustrating the positioning and spacing of fluid emitters 134 positioned along each tape 132 relative to potato seeds 20. The position of gaps 116, 118 and 117, 119, and 121 are also shown.

In order to understand the benefits provided by system 100, it is important to appreciate certain growth features of potato plants. A potato plant is a shallow rooted crop that does not respond favorably to extremes in soil moisture, such as where moisture levels are either too wet or too dry. Potato plants grow best when soil moisture is maintained within a narrow range where needed moisture is available, but aeration of the root zone is also maintained. One distinguishing feature of irrigation drip tape (such as tape 132) is that it employs a turbulent flow path between a main flow channel, or supply tube, and an emitter, or outlet. The emitter track is designed to produce a specific flow rate and depending on the water pressure and emitter spacing, the flow rate for the tape is defined to optimally deliver water to the moisture-permeable agronomic corridor. With recent advances in drip tape technology, very low emitter flows can be achieved, allowing for a soil environment adjacent to the tape that is minimally impacted by over-wet conditions. This in turn, allows a potato seed-piece (such as seeds 20) to be placed relatively close to the drip tape where soil moisture conditions are optimally maintained.

FIG. 5 shows an exemplary bed 112 in elevational view taken along line 5—5 of FIG. 3. Gaps 116 and 118 for tractor wheels are shown on either side of bed 112. Likewise, tapes 132 (and emitters) are provided intermediate each pair of parallel rows of potato plants (identified by seeds 20) below a soil surface 36 of bed 112 in the agronomic soil corridor. The agronomic soil corridor corresponds with the solar light corridors 40 and 42, but is provided directly beneath such corridors, within the respective soil. A plurality of pairs of parallel rows 124, 126 and 128, 130 of potato plants (coincident with seeds 20) in bed 112 having an inter-row gap 117, 119, and 121 (of FIG. 3) between each pair of rows spaced from one another sufficiently to provide a solar light corridor to provide increased solar energy to the potato plants and a moisture permeable agronomic soil corridor 40 and 42 (of FIG. 9) between the pairs of rows and beneath the solar light corridor to provide a supply of water and nutrients to a root zone of each row of a pair of rows of potato plants while maintaining aerated soil above the agronomic soil corridor in the solar light corridor to reduce excessively wet conditions adjacent the crop canopy.

A generalized drawing of the preferred embodiment is given in FIG. 5. More particularly, dimension A represents a distance between tractor wheels defining the width of bed 112, dimension B represents the distance between the interior potato rows 126 and 128, and dimension C represents the lateral distance between the drip tape 132 and seed piece (potato row) 20.

According to one construction, common bed widths (dimension A) for this production system can range from 68 inches to 108 inches, for four potato rows 124, 126, 128, and 130, depending on various factors such as potato variety and intended market, equipment availability and climate. The bed width, A, is defined by the distance between the tractor wheel furrows provided by gaps 116 and 118.

According to another construction, greater bed widths are also possible, in order to accommodate a total of six rows and three lines of tape in an alternative embodiment of the invention employing the same geometry.

Another dimension used to define bed 112, dimension B, will range from 14 inches on smaller beds to 34 inches for the 102 inch bed according to the one construction. Finally, dimension C will range from 7 to 11 inches, depending on the bed width chosen.

In order to further define the geometry of bed 112, the ratio of dimension C to the average tape spacing (half of dimension A) will range from 0.13 to 0.25. Secondly, the combination of dimensions B and C will be such that the horizontal areas, represented by the inside and outside seed pieces, will not differ by more than 30 percent. This is important in order to ensure that both sunlight energy and agronomic requirements (soil moisture and fertility) are balanced between the inside potato rows 126, 128 and the outside potato rows 124 and 130.

With potato production system 100, it has been determined that the average area required for each plant (square feet of sunlight per plant) can be decreased from what is conventionally believed to be ideal at approximately 2.7 square feet per plant (for russet potatoes). Field observations in a commercial production setting with this system have shown that average areas per plant can range from 1.6 to 2.3 square feet, depending on the potato variety and target market. This is approaching 15% less space per plant. Depending on the bed width, the in-row spacing (seed piece drop down the row) can be adjusted to meet the space requirements. Furthermore, the in-row spacings may be different between the inside and outside rows in order to achieve the proper space requirements for each row. Optionally, seeds in adjacent rows can be offset so that a seed in one row is midway between adjacent seeds in an adjacent row (in a longitudinal direction of the rows).

There is one more parameter to define potato production system 100, the rate at which irrigation water is supplied to each potato row 124, 126, 128, and 130 by the irrigation drip tape 132. As mentioned previously, tape flow is typically defined in terms of the volume of water per unit per unit length of drip tape. In English units, the tape flow is commonly given as gallons per minute per 100 feet. The drip tape flows specified for this production system will range from a nominal flow of 0.110 to 0.220 gpm/100 ft, depending mainly on the bed width and soil texture (is one example). To define the parameter of interest, both the drip tape flow and dimension C are used to calculate a theoretical rate of flux at the seed piece, based on a circle of radius C whose center is located at the tape. For this production system, the flux will range from 0.004 to 0.017 inches per hour at the seed piece. This parameter is important in that it defines the optimal region for seed piece placement in terms of the drip tape chosen.

FIG. 6 shows a tractor 50 including a tool bar 52 configured to lay irrigation drip tape within beds of a potato field. More particularly, four irrigation drip tape carrier and delivery systems 54 are carried by tool bar 52 for simultaneously laying tapes 132 of bed 112 and tape 132 of rows 128 and 130 of bed 110 and tape 132 of rows 124 and 126 of bed 114 (see FIG. 3). Tape 132 between rows 124 and 126 of bed 110 and tape 132 between rows 128 and 130 of bed 114 are laid in a prior and subsequent pass using tractor 50.

Figure 7:
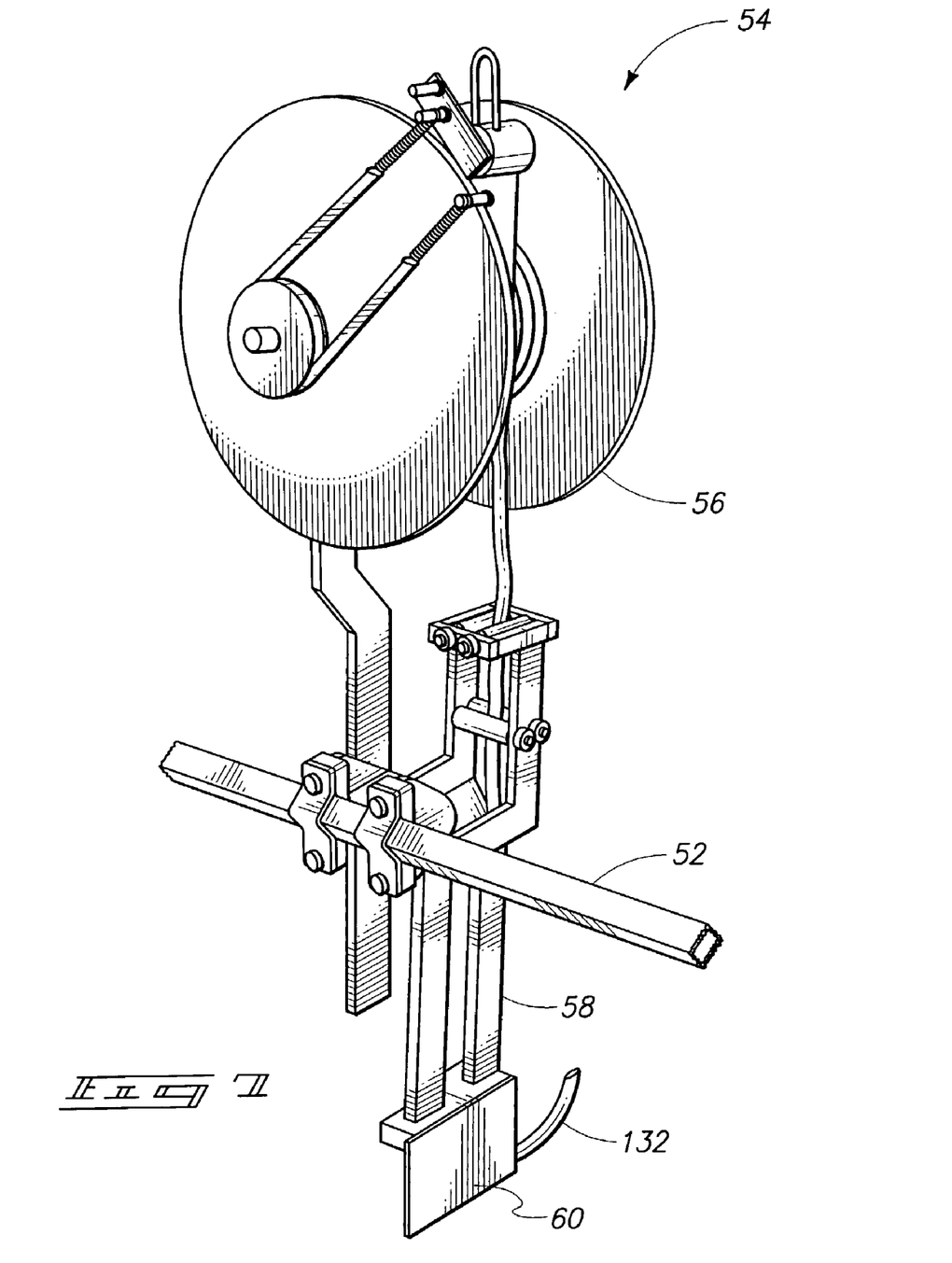
FIG. 7 is an enlarged isometric view illustrating one tape delivery system used on the tractor of FIG. 6 for laying drip irrigation tape.

FIG. 7 depicts one construction for tape carrier and delivery system 54. More particularly, system 54 includes a self-unwinding tape spool 56 on which a roll of tape is stored. A hollow delivery tube 58 of system 54 allows passage of irrigation drip tape 132 from reel 56 into soil where tape 132 exists from a tape injection shoe 60. Shoe 60 has a wedge-shaped leading end that moves soil to provide for deposition of tape 132 beneath a soil surface. Preferably, tape 132 is secured at a free end to a position in a field, prior to starting movement of a tractor. Once secured, tape 132 is withdrawn from each system 54 as the tractor moves down a field.

Figure 8:
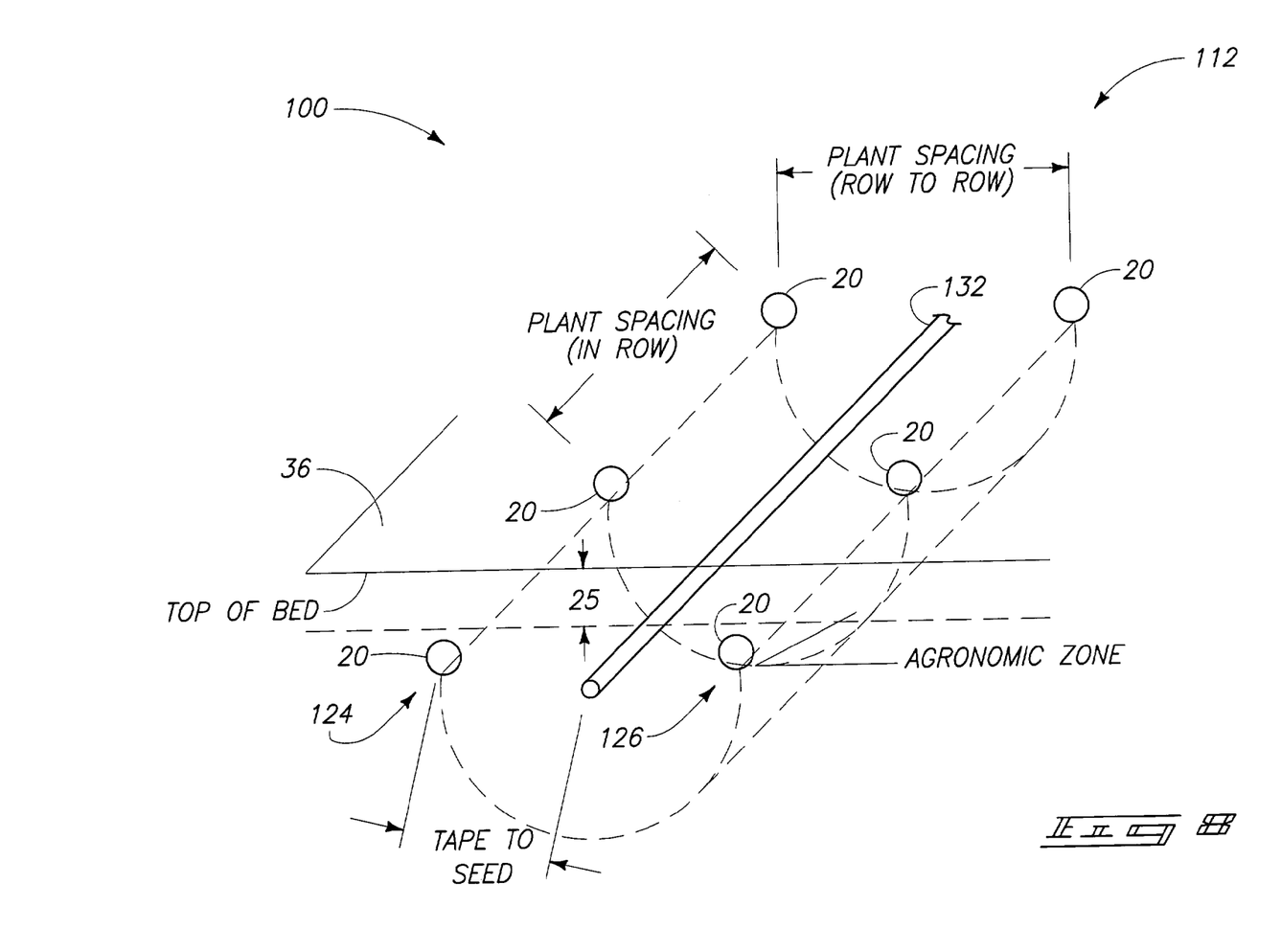
FIG. 8 is a simplified schematic and isometric view illustrating a portion of a potato bed from FIGS. 3–5.
Figure 11:
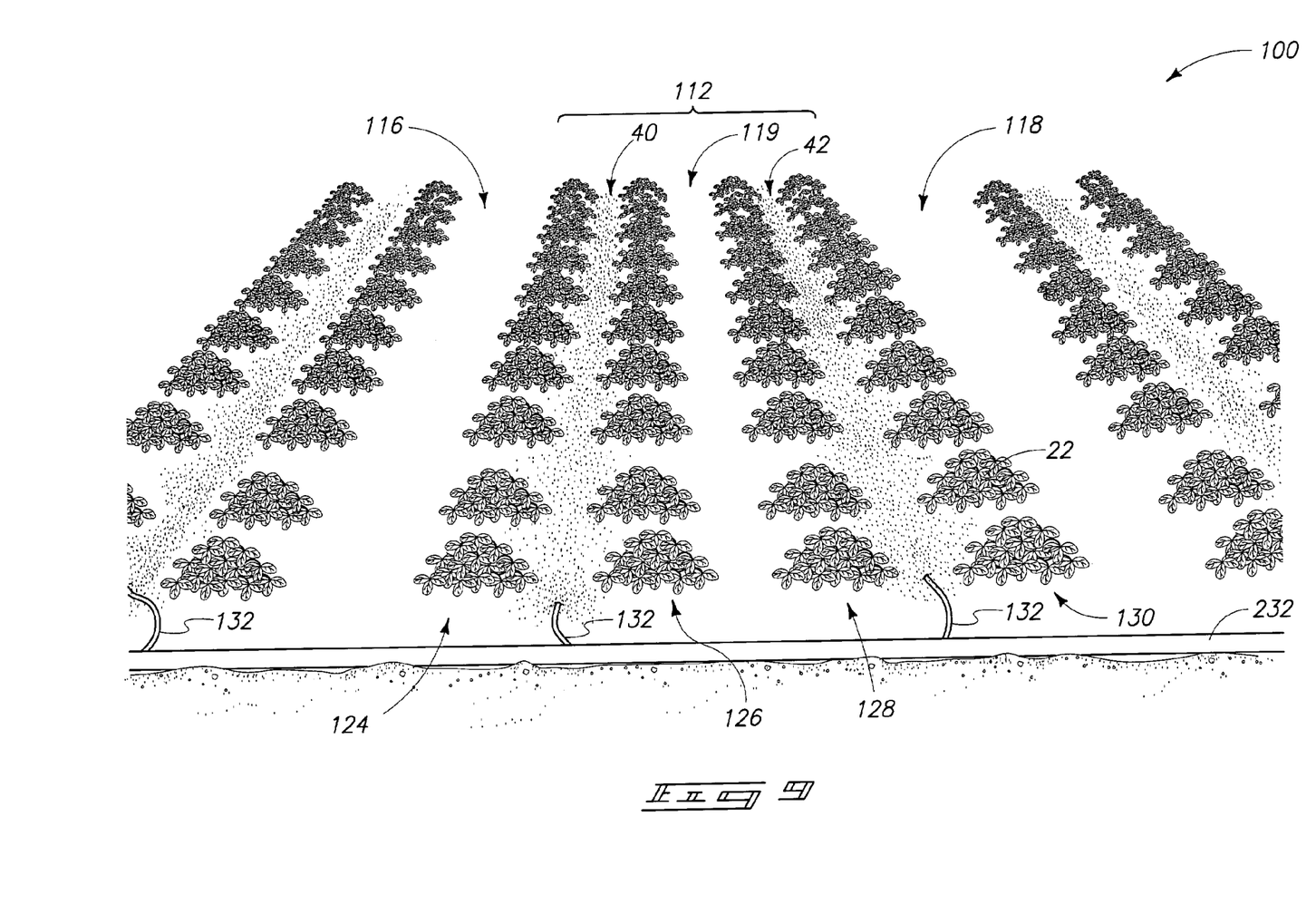

FIG. 8 shows in simplified schematic view system 100 within a portion of bed 112. More particularly, tape 132 is found to be optimally placed in order to maximize health and production of potato crop from plants grown from seeds 20. Such optimization results from the adjacent proximity of each seed 20 along tape 132 and the associated emitters. By way of one example, seeds 20 are provided below soil surface 36 of bed 112 a distance of 4 to 7 inches. An aerated soil zone 25 is 80 percent of the distance of 4–7 inches (see FIG. 8), according to one construction. Seeds 20 are provided a distance of 7 to 11 inches from tape 132. A semi-cylindrical agronomic zone is shown extending around tape 132 within which water (and fertilizer) can be provided for optimal growth to potato plant roots from seeds 20.

FIG. 9 depicts in simplified isometric view potato plants growing in the beds of FIGS. 3–5, such as bed 112. Gaps 116 and 118 clearly show clearance room for tractor wheels between adjacent beds which typically form furrows. A central irrigation pipe 232 feeds water (and optionally fertilizer) to individual irrigation drip tapes 132 that are optimally positioned between rows of potato plants, such as rows 1224, 126, 128, and 130. Each plant is illustrated in a middle growth stage where canopy 22 is not fully mature. Hence, light corridors can be seen within corridors 40 and 42, as well as within gap 119. Gaps 116 and 118 (as well as gap 119) provide further light corridors between adjacent rows of potato plants that are provided in adjacent beds.

In summary, the present potato production system includes a crop bed, a plurality of row pairs of potato plants and a line-source irrigation system. The crop bed is defined by the distance between tractor wheels, or the respective furrows formed thereby. A plurality of pairs of potato plant rows are located within each bed. Each row pair is defined by a plane of symmetry vertically situated at a drip irrigation tape (or hose) located intermediate to the row pair, the proximity of which, in combination with the plant spacing in the row, sufficiently provides for an "equidistant and equal area" arrangement in a cartesian plane on the bed surface. The plurality of row pairs are placed in a symmetrical arrangement within each bed so as to further provide for equal solar light per plant. A line-source irrigation system includes the drip irrigation tape (or hose), with emitters, provided intermediate to each pair of parallel rows of potato plants, the proximity of which provides for an equal, uniform and optimal supply of water and nutrients to the plant root zone while maintaining aerated soil conditions and mitigating excessively wet conditions within the crop canopy.

Supporting field data has been generated and is provided here. The availability of data for comparison is limited, but some yield and grade information is available from field trials as well as from the USDA NASS for Washington, Oregon and Idaho in 2002 (Potato Stocks, Objective Yield Survey). Though not resulting from a direct comparison in the field, this data helps to show the relative improvements that are possible in yield, uniformity of size and grade.

One parameter of interest is the percent of potatoes above 6 ounces where a high value is desirable. Table 1 shows that the percent of potatoes above 6 ounces are 67.9 and 79.0 percent respectively for NASS survey samples from Washington and from the field employing the production system of the invention. Secondly, it can be seen that there is a higher percentage of potato tubers falling in the central 8–12 ounce category and lower percentages in the extreme size categories, indicating an improvement in the size distribution (30.4 and 43.8 percent respectively) in view of the target size. Table 2 shows a comparison of the grade, which is indicative of the uniformity of size and shape of the potatoes and, consequently, is reflective of the uniformity of growing conditions during the growing season. Lastly, Table 3 shows the average potato yield in Washington State, based on 2002 NASS statistics, in comparison with the payable yield from the production system of the invention, in this instance showing a 40 percent increase.

Table 1. Potato size distribution comparison for russet type potatoes. Data from NASS for Washington State in 2002 and from field trials employing the production system of the invention for Umatilla Russets.

TABLE 1

Potato size distribution comparison for russet type potatoes. Data from NASS for Wasington State in 2002 and from field trials employing the production system of the invention for Umatilla Russets.

| | | | | | Ounces | | | | | | |
|---|---|---|---|---|---|---|---|---|---|---|---|
| Size | <4 | 4–6 | 6 | 7 | 8 | 9 | 10 | 11 | 12 | 13 | >14 |
| | | | | | % | | | | | | |
| Washington | 9.0 | 23.1 | 9.6 | 9.7 | 8.7 | 6.8 | 5.7 | 5.0 | 4.2 | 3.9 | 19.1 |
| Invention | 7.5 | 13.5 | 8.2 | 7.2 | 13.6 | 9.7 | 6.6 | 7.8 | 6.1 | 3.4 | 16.5 |

TABLE 2

Potato grade distribution comparison for russet type potatoes. Data from NASS for Washington State in 2002 and from the potato processor for Umatilla Russet product received from the field employing the production system of the invention.

| | US No. 1 | US No. 2 | Cull | Total |
|---|---|---|---|---|
| | | % | | |
| Washington | 72.0 | 26.5 | 1.5 | 100.0 |
| Invention | 93.0 | 5.6 | 1.4 | 100.0 |

TABLE 3

Potato yield comparison for russet type potatoes. Data from NASS for Wasington State in 2002 (Potato Stocks) and from potato processor as reported on contact incentive summary for Umatilla Russet.

| | Yield | |
|---|---|---|
| | cwt/ac | tons/ac |
| Washington (avg) | 544 | 27.2 |
| Invention | 784 | 39.2 |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An arrangement for improving the yield of potato crops, comprising:
a bed for multiple rows of potato plants;
a plurality of pairs of parallel and adjacent rows of potato plants in the bed during an early growth phase prior to final maturity and maximum canopy growth having an inter-row gap between the rows in each pair of rows spaced from one another sufficiently to provide a moisture permeable semi-cylindrical agronomic soil corridor between the rows in each pair of rows to provide a supply of water to a root zone of each row within each pair of rows of potato plants while maintaining an aerated soil zone within and above the agronomic soil corridor to reduce excessively wet conditions adjacent the crop canopy and a solar light corridor provided between adjacent pairs of rows to provide increased solar energy to the potato plants; and
a drip irrigation tape with emitters provided between the rows within each pair of parallel rows of potato plants below a soil surface of the bed in the agronomic soil corridor.

2. The arrangement of claim 1 wherein the distance between adjacent rows in respective, adjacent pairs of rows is from about 14 inches to about 34 inches.

3. The arrangement of claim 1 wherein the distance between drip irrigation tape and an adjacent row is from about 7 inches to about 11 inches.

4. The arrangement of claim 1 wherein the bed is between 68 inches and 108 inches wide.

5. The arrangement of claim 1 wherein a distance between the drip irrigation tape and an adjacent row of potato plants versus a distance between adjacent drip irrigation tapes is a ratio between 0.13 and 0.25.

6. The arrangement of claim 1 wherein a distance between each pair of rows and a distance between adjacent rows in adjacent pairs of rows varies no more than 30 percent.

7. The arrangement of claim 1 wherein the plurality of pairs of rows comprises two pairs of rows of potato plants and the drip irrigation tape comprises two drip irrigation tapes, one of which is provided between a first pair of rows and another of which is provided between a second pair of rows.

8. The arrangement of claim 1 wherein the drip irrigation tape has a nominal fluid flow rate of between 0.110 to 0.220 gallons per minute per 100 feet of tape.

9. The arrangement of claim 1 wherein there exists two pairs of parallel rows of potato plants within each bed.

10. The arrangement of claim 1 wherein the arrangement of beds realizes a plant population for russet potatoes of between 1.6–2.5 square feet of soil surface per plant.

11. The arrangement of claim 1 wherein the emitters within each row are at least 4 inches apart.

12. The arrangement of claim 1 wherein the potato plants comprise red potato plants, and wherein a ratio of 0.85–4.5 plants per emitter is provided.

13. The arrangement of claim 1 wherein the potato plants comprise russet potato plants, and wherein a ratio of 0.42–3.3 plants per emitter is provided.

14. The arrangement of claim 1 wherein the drip irrigation tape further provides delivery of fertilizer to the moisture permeable agronomic zone.

15. An arrangement for improving the growing of potato crops, comprising:
a bed for multiple rows of potato plants each having a root zone;
a plurality of pairs of parallel and adjacent rows of earlier growth stage foliage-bearing potato plants in the bed having a gap between adjacent pairs of rows whose placement, in combination with in-row potato plant spacing, provides for a substantially equidistant, equal-area arrangement of light area per potato plant; and a line-source irrigation system comprising a drip irrigation tape, with emitters, provided between each row with each pair of parallel rows of potato plants, the proximity of the emitters and tape configured to provide a substantially equal, uniform and optimal supply of water to the root zone of each plant within each row while maintaining aerated soil conditions about the root zone of each plant and mitigating excessively wet conditions within a canopy of the potato plants.

16. The arrangement of claim 15 wherein the gap between adjacent pairs of rows provides a solar light corridor.

17. The arrangement of claim 16 wherein the solar light corridor comprises a gap having a distance between adjacent rows in respective, adjacent pairs of rows from about 14 inches to about 34 inches.

18. The arrangement of claim 15 wherein the distance between drip irrigation tape and each row in each pair of parallel rows laterally of the drip irrigation tape is from about 7 inches to about 11 inches.

19. The arrangement of claim 15 wherein the bed has a width of between 68 inches and 108 inches.

20. The arrangement of claim 15 wherein a distance between the drip irrigation tape and an adjacent row of potato plants versus a distance between adjacent drip irrigation tapes forms a ratio of between 0.13 and 0.25.

21. The arrangement of claim 15 wherein a distance between each pair of rows and a distance between adjacent rows in adjacent pairs of rows varies no more than 30 percent.

22. The arrangement of claim 15 wherein the beds of the arrangement realize a potato plant population for russet potatoes in the range of 1.6–2.5 square feet of soil surface per plant.

23. The arrangement of claim 15 wherein the emitters within a selected row are at least 4 inches apart.

24. The arrangement of claim 15 wherein the potato plants comprise red potato plants, and wherein a ratio of 0.5–1.5 square feet of soil surface is provided per plant.

25. The arrangement of claim 15 wherein the potato plants comprise russet potato plants, and wherein a ratio of 1.4–2.6 square feet of soil surface is provided per plant.

26. The arrangement of claim 15 wherein the line-source irrigation system further provides a supply of nutrients to the root zone of each plant.

27. The arrangement of claim 1 wherein the aerated soil zone has a depth of 80% of a depth of a newly planted seed for each potato plant.

* * * * *

UNITED STATES PATENT AND TRADEMARK OFFICE
CERTIFICATE OF CORRECTION

PATENT NO. : 7,168,207 B2 Page 1 of 1
APPLICATION NO. : 10/409981
DATED : January 30, 2007
INVENTOR(S) : Brian L. Andersen et al.

It is certified that error appears in the above-identified patent and that said Letters Patent is hereby corrected as shown below:

Title Page 2, Item -56-, OTHER PUBLICATIONS, lines 9 and 10, please delete "http://www.netafirm.com/netafirm/doa_iis.dll/Serve/Item/English/1441" and insert --http://www.netafim.com/netafim/doa lis.dll/Serve/Item/English/1441--

Col. 7, line 17, please delete "defined in terms of the volume of water per unit per unit" and insert --defined in terms of the volume of water per unit--

Col. 8, line 8, please delete "1224" and insert --124--

Col. 9, line 3, please delete "Wasington" and insert --Washington--

Col. 9, line 33, please delete "Wasington" and insert --Washington--

Signed and Sealed this

Twenty-sixth Day of June, 2007

JON W. DUDAS
*Director of the United States Patent and Trademark Office*